United States Patent
Serrano Sanmiguel

(10) Patent No.: US 12,485,093 B2
(45) Date of Patent: Dec. 2, 2025

(54) COMPOSITION FOR USE AS AN ANTIVIRAL IN THE FORM OF NASAL DROPS AND IN NEBULISERS

(71) Applicant: DERMOPARTNERS, S.L., Valencia (ES)

(72) Inventor: Gabriel Serrano Sanmiguel, Valencia (ES)

(73) Assignee: DERMOPARTNERS, S.L., Valencia (ES)

( * ) Notice: Subject to any disclaimer, the term of this patent is extended or adjusted under 35 U.S.C. 154(b) by 215 days.

(21) Appl. No.: 18/263,673

(22) PCT Filed: Feb. 1, 2021

(86) PCT No.: PCT/ES2021/070076
§ 371 (c)(1),
(2) Date: Jul. 31, 2023

(87) PCT Pub. No.: WO2022/162254
PCT Pub. Date: Aug. 4, 2022

(65) Prior Publication Data
US 2024/0091153 A1    Mar. 21, 2024

(51) Int. Cl.
*A61K 9/127* (2025.01)
*A61K 9/00* (2006.01)
*A61K 38/40* (2006.01)
*A61K 38/44* (2006.01)

(52) U.S. Cl.
CPC ............ *A61K 9/127* (2013.01); *A61K 9/0043* (2013.01); *A61K 9/0078* (2013.01); *A61K 38/40* (2013.01); *A61K 38/44* (2013.01); *C12Y 111/01007* (2013.01)

(58) Field of Classification Search
CPC .... A61K 9/127; A61K 9/0043; A61K 9/0078; A61K 38/40; A61K 38/44; C12Y 111/01007
See application file for complete search history.

(56) References Cited

U.S. PATENT DOCUMENTS

2009/0246146 A1    10/2009    Banfi et al.

FOREIGN PATENT DOCUMENTS

| WO | 2001072262 A2 | 10/2001 |
| WO | 2020232515 A1 | 11/2020 |
| WO | 2020250209 A2 | 12/2020 |
| WO | 2021209652 A1 | 10/2021 |

OTHER PUBLICATIONS

Cegolon L. et al. Hypothiocyanite for the Prevention and Control of COVID-19. SSRN Electronic Journal, Apr. 18, 2020. Retrieved from https://ssrn.com/abstract=3579762.

(Continued)

*Primary Examiner* — Trevor Love
(74) *Attorney, Agent, or Firm* — Brown & Michaels, PC

(57) ABSTRACT

The invention relates to aqueous solutions containing a combination of lactoferrin with lactoperoxidase or with povidone iodine, encapsulated in liposomes, as active ingredients together with other components for use as nasal drops and nebulizers in combination with a mouth and face spray with antiviral, antiseptic and anti-inflammatory effects.

6 Claims, 1 Drawing Sheet

(56) References Cited

OTHER PUBLICATIONS

Cegolon L. et al. Nasal disinfection for the prevention and control of COVID-19: A scoping review on potential chemo-preventive agents. International Journal of Hygiene and Environmental Health, Aug. 18, 2020, vol. 230, pp. 113605.
International Search Report for PCT/ES2021/070076 dated Sep. 13, 2021.
Lang, et al. (2011) Inhibition of SARS Pseudovirus Cell Entry by Lactoferrin Binding to Heparan Sulfate Proteoglycans. PLoS ONE 6(8): e23710. doi:10.1371/journal.pone.0023710.
Martinez-Gomis J. et al. Effects of topical application of free and liposome-encapsulated lactoferrin and lactoperoxidase on oral microbiota and dental caries in rats. Archives of Oral Biology, 1999, vol. 44, pp. 901-906.
Tucker et al. "In vitro inactivation of SARS-CoV-2 with 0.5% povidone iodine nasal spray (Nasodine) at clinically relevant concentrations and timeframes using tissue culture and PCR based assays"; retrieved from https://www.biorxiv.org/content/10.1101/2021.01.31.426979v1; Feb. 2021.

COMPOSITION FOR USE AS AN ANTIVIRAL IN THE FORM OF NASAL DROPS AND IN NEBULISERS

SECTOR OF THE ART

The object of the present invention is applicable in the field of the medical and pharmaceutical industry since it is a composition that is used to prevent and/or treat bacterial and viral infections.

OBJECT OF THE INVENTION

It is an object of the invention to produce and provide nasal drop compositions effective in blocking bacteria and viruses on the mucous membrane and in the nasal sinuses during infections commonly known as colds. Excessive secretion of the mucous membrane causes a large exfoliation, excoriation, bruising and erythematous irritation of the membrane. The present invention seeks, therefore, to provide effective compositions, with local topical application, to soothe and stimulate the healing process on the surface of the mucous membrane of the nose and nasopharynx, and thus counteract and reduce the irritant and caustic nature of the catarrhal exudate associated with the above conditions. According to the present invention, it has now been discovered that a particular mixture of lactoferrin and povidone iodine or lactoferrin and lactoperoxidase can be provided which, when in contact with the mucous membrane of the nose and nasopharynx in the form of a liposomal water solution, causes the catarrhal exudate to reduce and soothes and stimulates the healing process.

The invention relates to a new and improved therapeutic agent for local topical application in the treatment of the mucous membrane when it is irritated and/or infected as a consequence of common colds, viral infections including SARS-CoV-2 (COVID-19), chronic sinusitis, allergic rhinitis, etc., and which more specifically includes a combination of lactoferrin with povidone iodine or with lactoperoxidase, both encapsulated in a phosphatidylcholine nanoliposome.

PRIOR ART

Different patents or publications are known regarding the effect of lactoferrin to combat the common respiratory virus and SARS-CoV2 (COVID-19) as well as to prevent the transmission of these viruses between humans.

Thus, for example, the document "LANG, JIANSHE, et al. Inhibition of SARS pseudovirus cell entry by lactoferrin binding to heparan sulfate proteoglycans" refers to the use of lactoferrin in the treatment of coronavirus infections.

It is also worth mentioning PCT/ES2020/070245 by the same inventor and proprietor that refers to a composition for the treatment and prevention of infections by COVID-19 and other coronaviruses that comprises liposomal lactoferrin.

In none of these cases is the combination of liposomal lactoferrin with lactoperoxidase or povidone iodine and xylitol mentioned, nor is it used in the form of nasal drops and nebulizers in combination with mouth and face sprays to prevent transmission of the common respiratory virus and SARS-CoV2 (COVID-19) among humans.

DESCRIPTION OF THE INVENTION

Figure 1:
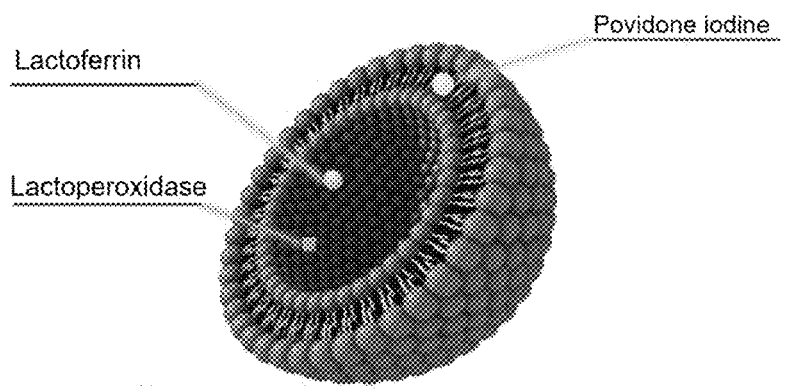
FIG. 1 shows an image in which the location of lactoferrin, lactoperoxidase and povidone iodine in the phosphatidvlcholine liposome is represented.
Figure 2:
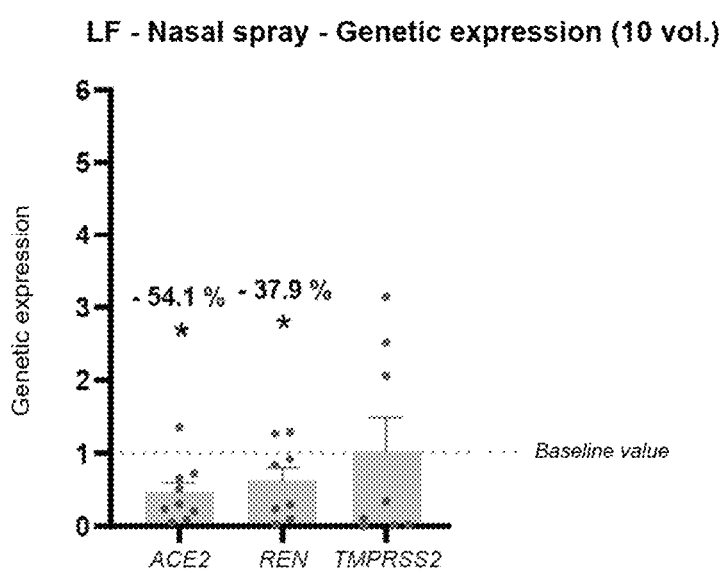
FIG. 2 shows a graph of gene expression before (baseline values) and after nasal spray treatments.

Based on the prior art, the objective of the present invention is to provide a pharmaceutical composition that can combat and/or prevent infection by coronavirus.

The respiratory virus and new emerging viruses such as SARS-CoV-2 constitute a serious public health problem, which quickly becomes a global security challenge after sparking a global pandemic likely to last for several years.

The invention includes a set of drops and nasal sprays as well as mouth sprays to be used as a method of prevention against different respiratory viruses, including SARS-CoV-2 (COVID-19), and whose main ingredients include liposomal lactoferrin, lactoperoxidase, povidone iodine and xylitol.

The present invention relates to an aqueous suspension for nasal drops containing liposomal lactoferrin, which is a multifunctional protein with various properties, and the antiseptic povidone iodine or lactoperoxidase, also encapsulated in phosphatidylcholine liposomes, as main ingredients to be used by intranasal administration for the inactivation of different types of viruses including SAR-CoV-2. The liposomes themselves also serve as an important active ingredient. The mechanism of action is related to the blocking of ACE2 receptors found on nasal epithelial cells and to the priming arrest of the virus spike protein induced by lactoferrin and liposome components.

Nasal sprays not only block the virus from entering the nose, the mouth and nasopharynx, rather, they decrease the viral load and the severity of clinical manifestations in infected patients.

Intranasal ACE2 receptors have been shown to be the key factors in SARS-CoV-2 (COVID-19) infection. Initial viral load is a key determining factor for clinical manifestations.

Lactoferrin has been shown to compete with S protein for a place in the host cell membrane, thus preventing binding between the virus and specific receptors. SARS-CoV-2 uses angiotensin-converting enzyme 2 (ACE2) and transmembrane protease serine 2 (TMPRSS2) to enter target cells. Priming of S proteins by host cell proteases is important for viral entry into cells and includes cleavage of the S protein at S1/S2 and S2 sites. This protease improves the transmissibility of the virus. Liposomal lactoferrin can act in two ways. First, by binding liposomal lactoferrin to the ACE2 receptor and, on the other hand, liposome components can induce protein changes in TMPRSS2 by modifying further cell entry of the SARS-CoV-2 virus.

Polyvinylpyrrolidone polymer with iodine, also known as povidone iodine, has been discovered and marketed as a disinfectant since 1955.

Povidone iodine is a water-soluble iodophor (or iodine-releasing agent) consisting of a complex between iodine and a solubilizing carrier polymer, polyvinylpyrrolidone. In aqueous solution, there is a dynamic equilibrium between free iodine (I2), the active bactericidal agent and the povidone iodine complex. Povidone iodine is of primary interest due to its ability to inactivate a wide range of pathogens, lack of microbial resistance and a long history of clinical use.

In vitro viricidal activity of topical and oral povidone iodine products against SARS-CoV-2 was recently reported. All products tested containing povidone iodine concentrations ranging from 0.45% to 10% showed 99.99% viricidal activity against SARS-CoV-2 within 30 seconds of contact with the virus. Furthermore, a phase III clinical trial (AC-TRN12619000764134) is underway to evaluate the safety and efficacy of povidone iodine nasal spray in the treatment of subjects affected by the common cold, potentially caused by human coronaviruses.

Lactoperoxidase is a host defense factor found in exocrine secretions, like milk and saliva, and it is believed that it contributes to the maintenance of oral and nasopharyngeal hygiene. Lactoperoxidase catalyzes the hydrogen peroxide-dependent oxidation of thiocyanate to hypothiocyanite, exhibiting a bactericidal effect against pathogenic bacteria. The combination of lactoferrin and lactoperoxidase has been reported to suppress oral pathogens more effectively than either agent alone.

Xylitol is a polyol that has been used as a sugar substitute in Finland since the 1960s. It is obtained from xylan extracted from hard wood, which has been shown to have multiple health benefits. Xylitol is a sugar alcohol. It is made from xylose, which is a wood sugar. The human body naturally produces around 10 grams per day. As such, it cannot be considered a drug. It is also well known for its beneficial properties in fighting tooth caries. It has been widely used in oral health care to prevent caries due to its antibacterial capacity. It is already being used in otolaryngology as a nasal spray and wash for the treatment of rhinosinusitis and the prevention of otitis media. The "in vitro" studies and studies in animal models have demonstrated the antiviral properties of xylitol against human respiratory syncytial virus. Recently, xylitol at a concentration of 5% m/v has been shown to be viricidal and exhibit antiviral activity on SARS-CoV-2.

Liposomal lactoferrin can create a protective shield over human cells in the respiratory tract, preventing the entry of the virus. If the person is already infected, the antiviral protein can stop viral replication and multiplication. Lactoferrin has been shown to be very effective against common viral flu and in vitro trials have revealed that lactoferrin inhibits the coronavirus.

In vitro studies conducted in Brazil revealed that lactoferrin is capable of inhibiting SARS-CoV-2 in African green monkey kidney epithelial cells and in adenocarcinoma human alveolar basal epithelial cells (A549) at 1 mg/ml, suggesting that lactoferrin has the potential to constitute a biochemical approach to combat the novel coronavirus pandemic. Regarding the in vitro studies, more interesting are the results published in Spain where both non-encapsulated lactoferrin and liposomal lactoferrin managed to block viral entry into host cells by interacting with viral and/or cell surface receptors, the activity of liposomal lactoferrin being higher than non-encapsulated lactoferrin. Recently, US research reported that from a library of 1441 FDA-approved compounds and clinical candidates, lactoferrin exhibited effective inhibition of SARS-CoV-2 infection with an IC50 of 308 nm and potentiated the efficacy of both remdesivir and hydroxychloroquine. Given its safety profile in humans, these data suggest that lactoferrin is a readily translatable therapeutic adjunct for COVID-19.

PREFERRED EMBODIMENT OF THE INVENTION

As a preferred embodiment, a nebulizer is envisaged that includes a composition in the form of a nasal solution for its inhalation.

This composition, useful for the treatment of upper respiratory tract infections and inflammatory diseases of the respiratory tract such as bronchial asthma because it has a highly selective local anti-inflammatory action.

These nasal drops can be used in the prevention and treatment of nasal hypersensitivity, such as allergic rhinitis and vasomotor rhinitis, and inflammatory diseases of the upper respiratory tracts, such as rhinitis and sinusitis, using these compounds.

This composition then consists of an aqueous suspension for nasal drops, in which the active ingredients lactoferrin and povidone iodine are encapsulated in phosphatidylcholine nanoliposomes that will provide additional viricidal activity, increased penetration into the nasal mucosa, extended/delayed release, being sprayed in constant volume spray, with good redispersibility and high retention capacity after intranasal administration, in addition to having a good posterior sensation that does not show irritability in the nasal mucosa and long-term stability, therefore it is useful for preventive and therapeutic use in various respiratory tracts.

It also includes a wetting agent (xylitol) in the aqueous nasal drops to prevent mucosal dryness and irritation. The wetting agent provides a high suspending effect of the nasal drop composition of the present invention. Examples of such wetting agents are propylene glycol, glycerol, sorbitol, carboxyvinyl polymer, carmellose sodium, povidone, polyethylene glycol and agar or mixtures thereof. A preferable example is xylitol, propylene glycol or glycerol. Xylitol or propylene glycol or glycerol can be used, alone and a combination thereof, which produces an improved effect on the suspension of the composition.

The addition amount of the wetting agent is variable from 0.05 to 30% by weight, more preferably 0.1 to 5% by weight of the total amount of the aqueous suspension for nasal drops of the present invention. In the case of the combination with propylene glycol and glycerol, the addition amount of propylene glycol to the aqueous suspension for nasal drops is preferably 0.05 to 20% by weight, more preferably from 0.1 to 1% by weight, and the addition amount of glycerol is preferably 0.1-6% by weight, more preferably 1-4% by weight.

The composition further includes a buffering agent which is further added to the aqueous suspension for nasal drops of the present invention. The buffering agent is included to maintain the stability of the suspension of the composition and to maintain the aqueous suspension at a pH of 5 to 7, which is less irritating to the nasal mucosa, more preferably maintain it at pH 6-7. Buffering agents are phosphates such as sodium hydrogen phosphate, potassium dihydrogen phosphate, dipotassium phosphate, anhydrous sodium dihydrogen phosphate, crystalline sodium dihydrogen phosphate; boric acid and borax; acetate such as sodium acetate; citric acid or citrate such as citric acid, citric anhydride, sodium citrate; amino acid salt such as sodium glutamate; and creatinine. Among them, phosphate is preferable, and preferably sodium hydrogen phosphate and potassium dihydrogen phosphate are used in combination. The pH of the aqueous suspension for nasal drops of the present invention with the use of the above buffering agent is preferably adjusted to pH 6-7.

The amount of buffering agent is variable between 0.005 to 2% by weight, more preferably 0.02 to 0.1% by weight of the total amount of the aqueous suspension for nasal drops of the present invention. In case of combination with sodium hydrogen phosphate and potassium dihydrogen phosphate, the addition amount of sodium hydrogen phosphate is preferably 0.01 to 1% by weight, more preferably from 0.03 to 0.04% by weight, and the addition amount of potassium dihydrogen phosphate is preferably 0.005 to 0.5% by weight, more preferably 0.02-0.03% by weight.

As for the preservative which is further added to the aqueous suspension for nasal drops of the present invention, it is preferably that which does not inhibit the suspension stability of the compound and which is less irritating to the nasal mucosa. Examples of such preservatives are phenol such as phenol, benzyl alcohol, phenylethyl alcohol and chlorhexidine; quaternary ammonium compound such as benzalkonium chloride and benzethonium chloride; p-hydroxybenzoate such as methyl p-hydroxybenzoate, ethyl p-hydroxybenzoate, butyl p-hydroxybenzoate and propyl p-hydroxybenzoate; alcohol such as ethanol and chlorobutanol; mercury compound such as thimerosal; sodium dehydroacetate; and myristyl-gamma-picolinium chloride. One such compound or two or more may be used in combination thereof. Among them, phenol (preferably phenylethyl alcohol) and/or quaternary ammonium compound (preferably benzalkonium chloride) are preferred, and a combination of phenylethyl alcohol and benzalkonium chloride is preferable.

The amount of preservative is variable from 0.001 to 1% by weight, more preferably 0.04 to 0.4% by weight of the total amount of the aqueous suspension for nasal drops of the present invention. In case of combination with phenylethyl alcohol and benzalkonium chloride, the addition amount of phenylethyl alcohol to the aqueous suspension for nasal drops is preferably 0.1 to 0.5% by weight, more preferably from 0.2 to 0.3% by weight, and the amount of benzalkonium chloride is preferably 0.001-0.08% by weight, more preferably 0.004-0.006% by weight.

In the aqueous suspension for nasal drops of the present invention, the amount of suspending agent, wetting agent, nonionic surfactant, buffering agent and preservative is adjusted to be within the osmotic pressure range used for the aqueous suspension for nasal drops. The preferred osmotic pressure is equivalent to the osmotic pressure of a 0.1-5% by weight aqueous sodium chloride solution, more preferably equivalent to the osmotic pressure of the 0.5-1.5% by weight aqueous sodium chloride solution.

The aqueous suspension for nasal drops of the present invention can be produced according to the known method. In other words, the composition with the active ingredients, the above suspending agent and the aforementioned additives are added to the pharmaceutically acceptable aqueous medium, such as purified water and distilled water for injection, to prepare a homogeneous suspension by mixing in a propeller mixer, homomixer, homogenizer, etc.

The aqueous suspension for nasal drops of the present invention is administered to the intranasal cavity by means of a method such as spraying and dripping used in general nasal drops. For example, in the spray method, the aqueous suspension for nasal drops of the present invention is sprayed one to four times a day, in a dose of approximately 25-200 µl, into the nasal cavities using a spray. In the drip method, the aqueous suspension for nasal drops of the present invention can be dropped through the nostril. The dose can be changed ad libitum according to age, body weight and symptoms.

Two products are then considered, one in which the active ingredient is a combination of lactoferrin and lactoperoxidase and another more potent (forte) in which the active ingredient is a combination of lactoferrin and povidone iodine.

Regarding the concentrations by weight of these liposomal components in a preferred embodiment, they would be the following:
Lactoferrin: 0.1% to 0.34%
Lactoperoxidase: 0.002% to 0.004%
Povidone: 0.5% to 1%

In the case of application by atomizer, the concentrations for 0.1 grams for each application of the nasal spray would be the following:
Lactoferrin: 0.1 mg to 0.34 mg
Lactoperoxidase: 2 µg to 4 µg
Povidone: 0.5 mg to 1 mg As a complement to the description provided herein, this specification is accompanied by FIG. 1, which shows an image in which the location of lactoferrin, lactoperoxidase and povidone iodine in the phosphatidylcholine liposome is represented.

Tests Carried Out

Coronaviruses use the surface spike (S) glycoprotein on the coronavirus envelope to bind host cells and mediate the fusion of the host cell membrane and the viral membrane during infection. Cellular entry of coronaviruses depends on the binding of viral spike (S) proteins to cellular receptors and the priming of the S protein by host cell proteases. Viral entry is also dependent on the activity of the TMPRSS2 protease. SARS-CoV-2 has been shown to use the SARS-CoV ACE2 receptor for entry and the TMPRSS2 serine protease for S protein priming.

Proteases and spike proteins are targets of choice for inhibition of SARS and MERS and several efforts have been made to develop inhibitors of their activities, through the use of experimental methods or virtual detection. However, many other biomarkers have recently been linked to virus entry into human cells, such as the renin receptor or aryl hydrocarbon.

Antivirals and nutritional supplements have been proposed as potentially useful against SARS-CoV-2, but few have been established clinically. Lactoferrin is a naturally occurring, non-toxic glycoprotein that is available orally as a nutritional supplement and has established in vitro antiviral efficacy against a wide range of viruses, including SARS-CoV, a coronavirus closely related to SARS-CoV-2. Lactoferrin as it is known is one of the components of the body's immune system, has antimicrobial activity (bactericidal and fungicidal) and is part of the innate defense, primarily in the mucous membranes. It has been suggested that lactoferrin may play a protective role in host defense against SARS-CoV infection by binding to HSPG and blocking preliminary interaction between SARS-CoV and host cells.

For all the above reasons, we will analyze here the functional effects of treatment with the compositions of the present invention on the metabolic pathways involved in virus entry into host cells (ACE2, REN, TMPRSS2 and AhR), by RT-qPCR gene expression analysis in nasopharyngeal swab samples obtained from 10 human volunteers.

Nasopharyngeal swab samples were obtained from 10 human volunteers, 30 minutes after the single treatment (1 spray in the nostril, ~58 μl) with the compositions of the present invention (LF Nasal Spray). The samples were processed, total RNA was purified, quantified and used to synthesize complementary DNA (cDNA). The volunteers were submitted to nasal treatments with these compositions in different weeks. The data was statistically analyzed, comparing the gene expression before (baseline values) and after each of the treatments.

The results indicated that treatment with the compositions of the present invention significantly inhibited the expression of the ACE2 and REN genes by 54.1±13.7% and 37.9±18.4%, respectively, compared to baseline values before treatment. No detectable results were obtained for the AhR gene in any of the samples tested.

In conclusion, the results indicate that treatment with the compositions of the present invention significantly inhibits the gene expression of ACE2 (angiotensin-converting enzyme I 2) and REN (renin), 30 minutes after a single application (1 spray, ≈58 µl) in 10 human volunteers, compared to baseline values before treatment.

These results suggest that treatment with these compositions may help protect against SARS-CoV-2 (COVID-19) infection, since the high levels of expression of ACE2 and REN are directly involved in facilitating the entry of the virus.

Having sufficiently described the nature of the invention, as well as a preferred exemplary embodiment, it is hereby stated for the appropriate purposes that the proportions of the components described may be modified, provided that this does not imply an alteration of the essential features of the invention that are claimed below.

The invention claimed is:

1. A composition of aqueous solutions for use in a form of nasal drops and nebulizers, the composition comprising an active ingredient which is a combination of lactoferrin together with povidone iodine encapsulated in a liposome,
    wherein a concentration by weight of lactoferrin within the liposome in the composition is between 0.1% to 0.34%, and
    wherein a concentration by weight of povidone iodine within the liposome in the composition is between 0.5% to 1%.

2. The composition of aqueous solutions for use in the form of nasal drops and nebulizers according to claim 1, further comprising a wetting agent selected from xylitol, propylene glycol, and glycerol, together or in combination.

3. The composition of aqueous solutions for use in the form of nasal drops and nebulizers according to claim 2, wherein a concentration by weight of the wetting agent is from 0.1% to 5%.

4. The composition of aqueous solutions for use in the form of nasal drops and nebulizers according to claim 1, wherein in a pharmaceutical presentation, the composition further comprising a wetting agent, a suspending agent, a nonionic surfactant, a buffering agent and a preservative.

5. The composition of aqueous solutions for use in the form of nasal drops and nebulizers according to claim 4, wherein the wetting agent has a concentration by weight from 0.1% to 5%.

6. The composition of aqueous solutions for use in the form of nasal drops and nebulizers according to claim 2, wherein in a pharmaceutical presentation, the composition further comprising a suspending agent, a nonionic surfactant, a buffering agent, and a preservative.

* * * * *